C. B. KING.
AUTOMOBILE.
APPLICATION FILED FEB. 28, 1912.

1,115,836.

Patented Nov. 3, 1914.
2 SHEETS—SHEET 1.

WITNESSES:
Paul A. R. Kroesing
Lotta Lee Bray

INVENTOR.
Charles B. King
BY
Ralzemond A. Parker
ATTORNEY.

C. B. KING.
AUTOMOBILE.
APPLICATION FILED FEB. 28, 1912.

1,115,836.

Patented Nov. 3, 1914.
2 SHEETS—SHEET 2.

WITNESSES:
Paul A. R. Kroesing.
Lotta Lee Bray.

INVENTOR.
Charles B. King
BY
Ralzemond A. Parker
ATTORNEY.

UNITED STATES PATENT OFFICE.

CHARLES B. KING, OF DETROIT, MICHIGAN, ASSIGNOR, BY MESNE ASSIGNMENTS, TO KING MOTOR CAR COMPANY, A CORPORATION OF MICHIGAN.

AUTOMOBILE.

1,115,836.  Specification of Letters Patent.  Patented Nov. 3, 1914.

Application filed February 28, 1912. Serial No. 680,473.

*To all whom it may concern:*

Be it known that I, CHARLES B. KING, a citizen of the United States, residing at Detroit, county of Wayne, State of Michigan, have invented a certain new and useful Improvement in Automobiles, and declare the following to be a full, clear, and exact description of the same, such as will enable others skilled in the art to which it pertains to make and use the same, reference being had to the accompanying drawings, which form a part of this specification.

My invention relates to automobiles and an object of my improvements is to provide an improved running gear for an automobile.

It is desirable in automobiles to provide an elastic support for the chassis upon the rear axle that shall admit of the greatest freedom of vertical motion while at the same time providing against the displacement horizontally of the axle relative to the chassis.

An object of my invention is, to secure greater freedom of vertical motion while providing improved means for preventing the undesirable displacement of the axle relative to the chassis or frame.

I secure this object in the device illustrated in the accompanying drawings, in which,—

Figure 1:
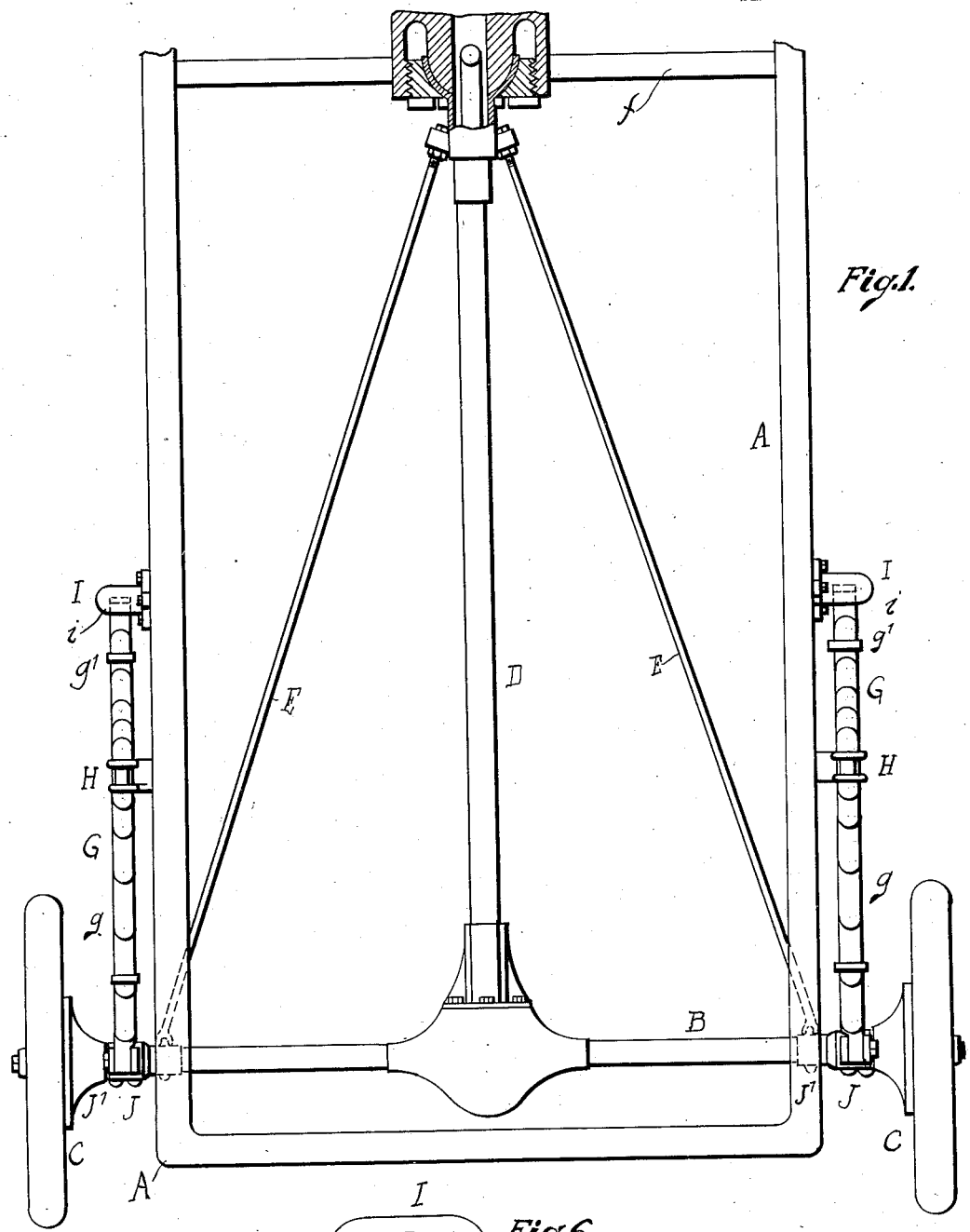
Figure 6:
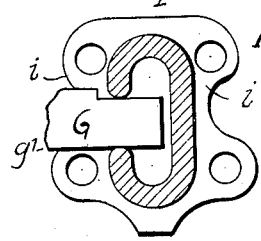
Figure 4:
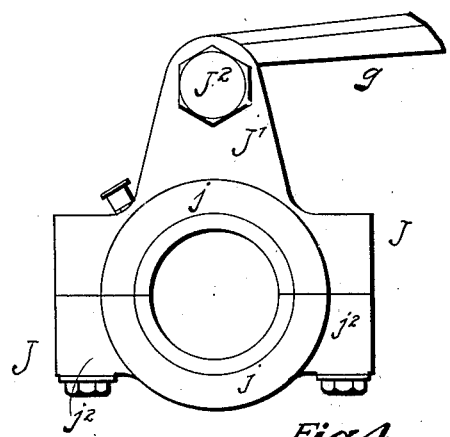
Figure 3:
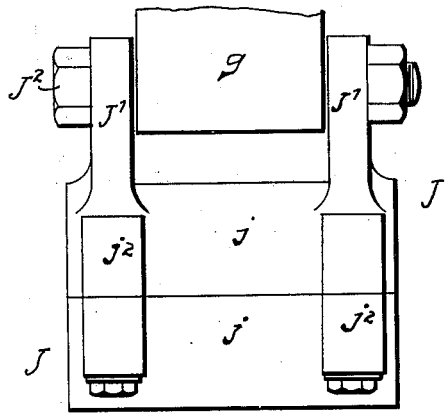
Figure 2:
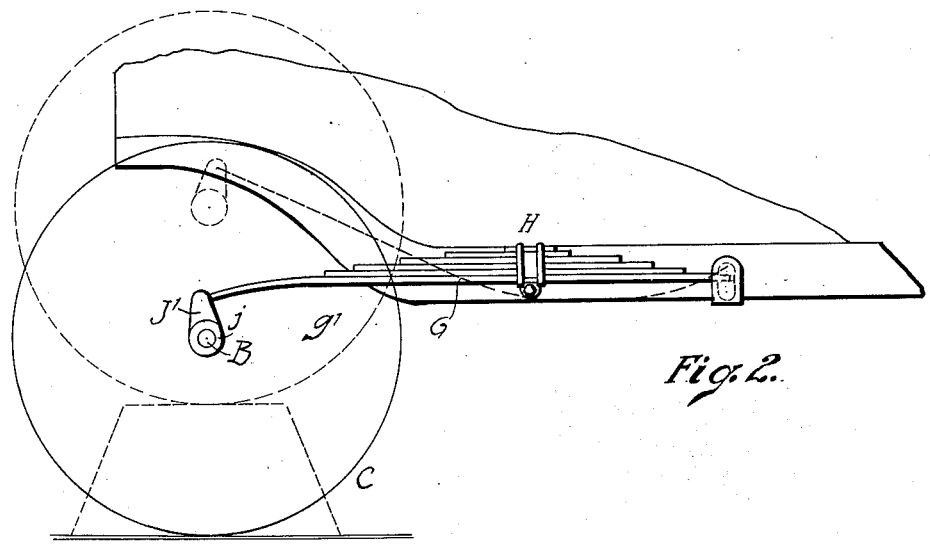
Figure 5:
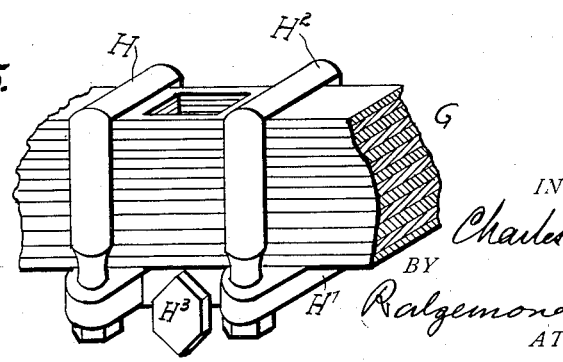

Figure 1, is a plan view of so much of the rear portion of an automobile embodying my invention as is necessary to illustrate the same. Fig. 2, is a side view of the apparatus of Fig. 1, the wheel being shown in outline. Fig. 3, is a detail view showing an elevation of the attachment for the rear end of the spring. Fig. 4, is a side view of the apparatus shown in Fig. 3. Fig. 5, is a perspective view of the attachment for the intermediate portion of the spring. Fig. 6, is a detail sectional view of the attachment for the front portion of the spring.

A, A is the frame of an automobile and B, is the rear axle.

C, C are the driving wheels upon the rear axle.

D, is a tubular casing for the transmission shaft. E, E are braces extending from toward the ends of the rear axle B, where they are pivotally attached and joined to the tubular casing D toward the end remote from the axle B. Said casing and brace rods are secured at the point F to the cross piece *f* of the frame A A and are provided at this point with a universal coupling.

G, G are the springs. Each of these springs is secured by clips H² (Fig. 5) to a plate H¹, which plate is pivotally secured to a side piece of the frame A by a bolt H³, thus constituting a pivoted coupling H for the intermediate portion of the spring. The rear end of each of the springs G, G is secured above the axle B by lugs J¹ J¹ and a bolt J² passing through eyes in the lugs J¹ J¹ and through an eye in the end of the spring. The lugs J¹ J¹ rise vertically from the upper half of a cylindrical coupling J. This coupling is divided into two halves *j j* which fit over the axle and are secured together by ears and bolts *j*². By this construction the rear end of the spring is firmly secured to the axle so as to permit of a slight movement forward and back relative thereto, as indicated at Fig. 2. The lugs J¹ J¹ extend upward on each side of the end of the spring so as to prevent motion of the spring laterally. The cylindrical coupling J forms a broad support upon the axle.

I, I are metal pieces bolted to the sides of the sides pieces A A of the frame and extending laterally therefrom. Each of the pieces I is hollow and is provided with a slot *i* extending horizontally inward from toward the rear of the vehicle. The forward end of each of the springs G enters the notch I and rests upon the lower wall of said notch while the sides of the spring bear against the sides of said notch. A portion of each of the springs G which extends backward from the pivoted coupling H is longer than the portion *g*¹ extending forward from said support. The lower walls of the notches *i i* support the ends of the spring so as to permit a small forward and backward motion and the side walls of said notches prevent the motion of said springs at this end in a direction lateral to the vehicle. It will be noticed that a slight forward and backward movement is provided for each end of each of the springs and the spring is pivoted at each of its three points of attachment. By this construction the springs are free in their action in a vertical direction and a strong construction is provided for preventing lateral motion. The rear ends of the springs being pivoted to the lugs J¹, J¹ vertically above the axis about which they turn, said lugs are turned by the movement of the spring into position to facilitate such movement.

What I claim is:—

1. In an automobile, the combination of a frame, a rear axle, a part rigidly secured to said rear axle and extending forwardly and upwardly, said part being secured at its forward end to the frame by a universal joint, and a cantaliver spring secured to said frame toward the center of said spring, one end of said spring being secured to the frame and the other end to said axle, said part being adapted to prevent relative motion of said axle and frame longitudinally of the latter and to leave relative motion in a direction at right angles thereto unrestrained.

2. In an automobile, the combination of a frame, a rear axle, a part rigidly secured to said rear axle and extending forwardly and upwardly, said part being secured at its forward end to the frame by a universal joint, and a cantaliver spring secured to said frame toward the center of said spring, one end of said spring being secured to said frame by a joint permitting free motion thereof longitudinal to said frame, and the other end of said spring being secured to the axle by a joint permitting a free movement thereof longitudinal of said frame, said part being adapted to prevent relative motion of said axle and frame longitudinally of the latter and to leave relative motion in a direction at right angles thereto unrestrained.

3. In an automobile, the combination of the axle B, the frame A, a spring G pivoted intermediate its ends to said frame, a fastening J pivoted on said axle and having lugs $j$ extending on opposite sides of the end of the spring, one end of said spring being pivoted to said lugs, the part I extending from said frame and having a slot $i$ therein the other end of said spring extending into said slot, substantially as and for the purpose described.

4. In an automobile, the combination of a frame, a rear axle, a part rigidly secured to said rear axle and extending forwardly and upwardly, said part being secured at its forward end to the frame by a universal joint, and a cantaliver spring secured to said frame toward the center of said spring, one end of said spring being secured to said frame and the other end of said spring being secured to said axle by a flexible joint, said part being adapted to prevent relative motion of said axle and frame longitudinally of the latter and to leave relative motion in a direction at right angles thereto unrestrained, the points at which said spring is secured being approximately in line with each other.

In testimony whereof, I sign this specification in the presence of two witnesses.

CHARLES B. KING.

Witnesses:
PAUL A. R. KROESING,
AGNES M. HIPKINS.